United States Patent
Kishi

(10) Patent No.: US 7,451,100 B2
(45) Date of Patent: Nov. 11, 2008

(54) METHOD, NETWORK SYSTEM AND CENTER FOR INTERMEDIATING TRANSACTIONS

(75) Inventor: Hiroyuki Kishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 623 days.

(21) Appl. No.: 09/795,321

(22) Filed: Mar. 1, 2001

(65) Prior Publication Data

US 2002/0026371 A1 Feb. 28, 2002

(30) Foreign Application Priority Data

Aug. 23, 2000 (JP) ............................. 2000-253054

(51) Int. Cl.
*G06Q 30/00* (2006.01)
(52) U.S. Cl. .......................................... 705/26; 705/37
(58) Field of Classification Search .................. 705/26, 705/8
See application file for complete search history.

(56) References Cited

U.S. PATENT DOCUMENTS

| | | | |
|---|---|---|---|
| 4,992,940 A | | 2/1991 | Dworkin |
| 6,151,582 A | * | 11/2000 | Huang et al. .................... 705/8 |
| 6,167,383 A | * | 12/2000 | Henson ......................... 705/26 |
| 6,324,522 B2 | * | 11/2001 | Peterson et al. ................ 705/28 |
| 6,721,713 B1 | * | 4/2004 | Guheen et al. .................. 705/1 |

FOREIGN PATENT DOCUMENTS

| | | |
|---|---|---|
| EP | 0 899 674 A2 | 3/1999 |
| JP | 5-307556 | 11/1993 |
| JP | 08-147374 | 6/1996 |
| JP | 09-218899 | 8/1997 |
| JP | 10-269447 | 10/1998 |
| JP | 11-085841 | 3/1999 |
| JP | 2000-57214 | 2/2000 |
| WO | 00/68859 | 11/2000 |
| WO | 01/11523 A1 | 2/2001 |
| WO | 01/22255 A2 | 3/2001 |
| WO | 01/73521 A2 | 10/2001 |
| WO | 02/07051 A1 | 1/2002 |

* cited by examiner

*Primary Examiner*—James Zurita
(74) *Attorney, Agent, or Firm*—Staas & Halsey LLP

(57) ABSTRACT

In a method for intermediating a transaction in a transaction center intermediating a transaction between a customer buying a product and a retailer selling the product through a network, information concerning the product for said customer is provided. And information showing the product selected by the customer to buy is received and then a delivery schedule including a delivery date of the product is provided. Also, an order from the customer is received and information concerning the order to the retailer is provided.

9 Claims, 8 Drawing Sheets

METHOD, NETWORK SYSTEM AND CENTER FOR INTERMEDIATING TRANSACTIONS

BACKGROUND OF THE INVENTION

1. Field of the Invention

The present invention generally relates to methods, network systems and centers for intermediating transactions, and more particularly to a method, a network system and a center for intermediating transactions, in which each transaction is processed in a real time.

2. Description of the Related Art

The Internet has become widely used and online transaction is actively conducted.

Recently, any product possible to buy and sell such as a book, a publication, a peripheral for a personal computer, a cloth, a food, a gift, a toy, a real estate or the like can be traded by online.

A consumer accesses a shopping mall site and then refers to various product information and easily makes an order.

In the online transaction, an invention described in Japanese Laid-Open Patent Application No. 2000-57214 is known in that an order is interactively received and a price is determined by associating with a delivery time.

In a product order receiving method according to this invention in that a production cost is changed based on an amount of products and a delivery time, a request concerning product order (the number of product, information specifying a product and the like) is received from a customer via online and then the delivery time and the product price in a case of accepting the request are provided to the customer in accordance with a procedure for determining the delivery time and production cost based on a current production status when a production schedule is changed.

In addition, in Japanese Laid-Open Patent Application No. 5-307556, the invention discloses that sales can be conducted at a shop by referring to a product stock status by using a database integrated by a computer network that electrically processes information concerning a series of transactions from a production planning of cloths and textiles to production and sales.

However, in the shopping mall site, the customer can not compare information related to the price, the delivery time and the like among a plurality of merchandisers selling the same product since it is not possible to obtain the information at the same time.

Thus, a purchaser of the product can not decide and make an order to a proper product merchandiser by considering the price and the delivery time.

For example, the purchaser of the product may want to make an order to a product merchandiser offering a cheaper price when the delivery time is later than the purchaser expects. On the other hand, when the delivery time is critical for the purchaser, the purchaser of the product may want to make an order to a product merchandiser who is punctual in delivering on time even if the product price is much more expensive. However, the above conventional method does not allow the purchaser to flexibly select the product merchandiser based on the consideration related to the product price and the delivery time.

Moreover, after the product merchandiser receives the order from the purchaser, the product merchandiser has to make a deal with a distribution company.

Another invention described in the Japanese Laid-Open Patent Application No. 2000-57214 discloses a method for receiving such a special product order in which production cost is fluctuated by the product amount and the delivery time. This invention is not used for transactions of ordinary products. Thus, it is not possible for the purchaser to make an order properly based on the consideration of the price and the delivery time among the plurality of the product merchandisers.

Another invention described in the Japanese Laid-Open Patent Application No. 2000-307556 discloses a method for managing a sales status and a product stock status at a shop in the apparel industry. Similarly to the invention described in the Japanese Laid-Open Patent Application No. 2000-57214, it is not possible for the purchaser to make an order properly based on the consideration of the price and the delivery time among the plurality of the product merchandisers.

SUMMARY OF THE INVENTION

It is a general object of the present invention to provide a method, a network system and a center for intermediating transactions in which the above-mentioned problems are eliminated.

A more specific object of the present invention is to provide a method, a network system and a center for intermediating transactions, in which a delivery schedule including the product price and the delivery time of a product for each product merchandiser is provided to a purchaser of the product through a communication network, and further, a transaction related to the product to purchase between corporations is completed when an order from the purchaser is received.

The above objects of the present invention are achieved by a method for intermediating a transaction in a transaction center intermediating a transaction between a customer buying a product and a retailer selling the product through a network, the method including the steps of: (a) providing information concerning the product for the customer; (b) receiving information showing the product selected by the customer to buy and providing a delivery schedule including a delivery date of the product; and (c) receiving an order from the customer and providing information concerning the order to the retailer.

According to the present invention, it is possible to provide a method in which the delivery schedule including the delivery date for each retailer dealing with the product can be provided to a customer buying the product through the network, and the transaction between corporations related to the product can be immediately completed at once when the order of the product is received from the customer.

The above objects of the present invention are achieved by a network system including a customer-client used by a customer conducting a transaction and connected to a network, and at least one transaction center connected to the network, the transaction center including: a product information providing part providing information concerning the product for the customer; and a delivery schedule information providing part receiving information showing the product selected by the customer to buy and providing a delivery schedule including a delivery date of the product, and the customer-client including: a product selecting part receiving the information concerning the product from the transaction center and selecting the product to buy; and an order issuing part receiving the delivery schedule information from the transaction center and issuing an order of the selected by the product selecting part.

According to the present invention, it is possible to provide a network system suitable for the above method in which the delivery schedule including the delivery date for each retailer dealing with the product can be provided to a customer buying the product through the network, and the transaction between corporations related to the product can be immediately completed at once when the order of the product is received from the customer.

The above objects of the present invention are achieved by a transaction center for intermediating a transaction between a customer buying a product and a retailer selling the product through a network, the transaction center including: a product information providing part providing information concerning the product for the customer; a delivery schedule information providing part receiving information showing the product selected by the customer to buy and providing a delivery schedule including a delivery date of the product; and an order information providing part receiving an order from the customer and providing information concerning the order to the retailer.

According to the present invention, it is possible to provide a transaction center suitable for the above method in which the delivery schedule including the delivery date for each retailer dealing with the product can be provided to a customer buying the product through the network, and the transaction between corporations related to the product can be immediately completed at once when the order of the product is received from the customer.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

An embodiment of the present invention will now be described with reference to figures.

Figure 1:
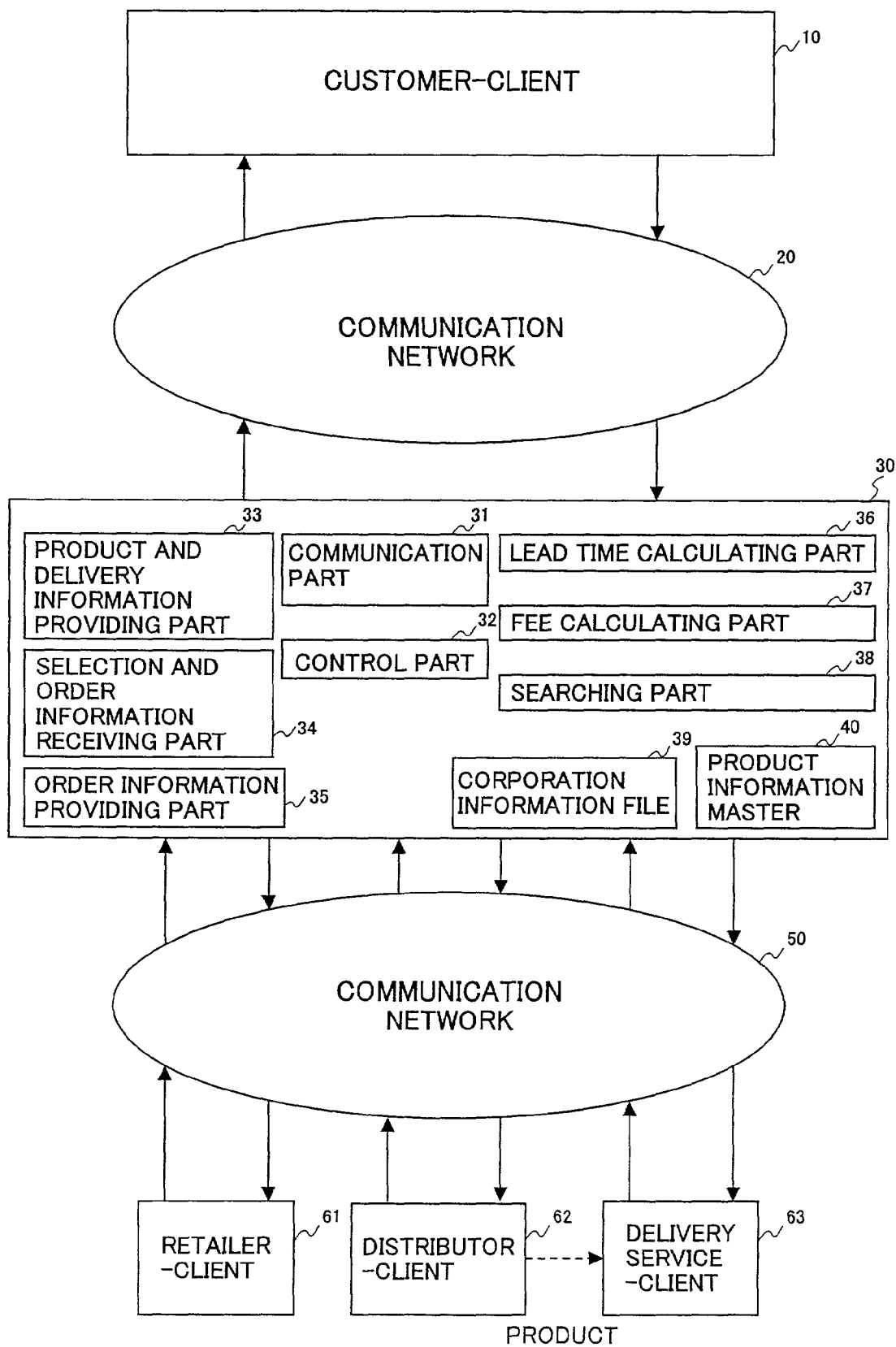
FIG. 1 is a diagram showing a configuration of an entire network transaction system according to the present invention.

FIG. 1 is a diagram showing a configuration of an entire network transaction system according to the present invention.

In FIG. 1, the entire network transaction system includes a customer-client 10 as a terminal computer for a customer, a communication network 20, a transaction server 30 as a transaction center, a communication network 50, a retailer-client 61 as a terminal computer for a retailer, a distributor-client 62 as a terminal computer for a distributor, and a delivery service-client 63 as a terminal computer for a delivery service.

For the sake of convenience, the retailer-client 61, the distributor-client 62 and the delivery service-client 63 are described as a single terminal, but a plurality of the retailer-clients 61, the distributor-clients 62 and the delivery service-clients 63 may be connected to the communication network 20 and the communication network 50.

One or more transaction servers 30 may be provided for regions, business types or product categories.

It should be noted that the customer-client 10 is a terminal computer, a portable computer (including a cellular phone) or the like provided for a client. Also, the retailer-client 61, the distributor-client 62 and the delivery service-client 63 are terminal computers, portable computers (including cellular phones) or the like provided for a retailer, a distributor and a delivery service, respectively.

The customer, the retailer, the distributor and the delivery service use the customer-client 10, the retailer-client 61, the distributor-client 62 and the delivery service-client 63, respectively, to attend a commercial transaction.

The distributor can be a wholesaler or the retailer can include a wholesale business. A product maker can attend this network transaction system.

The communication network 20 and the communication network 50 can be the Internet, a mobile communication network or the like. The communication network 20 can be the communication network 50 itself.

Through a digital line such as the Internet or an analog line, the customer-client 10 can be connected to the transaction server 30, and the retailer-client 61, the distributor-client 62 and the delivery service-client 63 can be connected to the transaction server 30. The retailer-client 61, the distributor-client 62 and the delivery service-client 63 can be connected to the transaction server 30 by separate communication lines.

The transaction server 30 intermediates a business transaction between the customers and the retailers and includes a communication part 31, a control part 32, a product and delivery information providing part 33, a selection and order information receiving part 34, an order information providing part 35, a lead-time calculating part 36, a fee calculating part 37, a searching part 38, a corporation information file 39 and a product information master 40.

The communication part 31 conducts a communication process among the customer-client 10, retailer-client 61, a distributor-client 62 and a delivery service-client 63.

For example, the communication part 31 sends signals from the product and delivery information providing part 33 to the customer-client 10. Also, the communication part 31 receives signals from the customer-client 10 and transmits the signals to the selection and order information receiving part 34.

In a case in which a plurality of transaction servers 30 are provided, the communication part 31 conducts the communication process for another transaction server 30.

The control part 32 includes a CPU (Central Processing Unit) and application software for a network transaction, and controls the entire transaction server 30 so as to carry out functions as a transaction center.

As described later, for example, when the customer-client 10 makes an information inquiry, the product and delivery information providing part 33 provides product information, purchase condition information, corporation information and the like. Further, when the customer-client 10 indicates product selection information (showing the product information which the customer considers buying) on an information inquiry window, the product and delivery information part 33 provides delivery schedule including a product name, a price, delivery date and the like in response to the indication from the customer-client 10.

The product and delivery information providing part 33 refers to the corporation information file 39 and the product information master 40 and then provides the product information and the delivery schedule to the customer-client 10.

For example, when the customer-client 10 inquires the product information, the product and delivery information providing part 33 refers to the product information master 40 and then provides information concerning the product to the customer-client 10. Also, when the product and delivery information providing part 33 receives the product selection information (showing the product information which the customer has selected to buy), the product and delivery information providing part 33 refers to the corporation information file 39 and the product information master 40. Moreover, the product and delivery information providing part 33 provides the delivery schedule concerning the product, which the customer selected, based on a calculation result by the lead-time calculating 36 and the fee calculating part 37.

A process conducted by the product and delivery information providing part 33 includes to refer to the corporation information file 39 and the product information master 40 when the customer-client 10 inquires the product schedule related to a specific product, and further to respond the customer-client 10 based on the calculation result of the lead-time calculating part 36 and the fee calculating part 37.

The selection and order information receiving part 34 receives the product selection information and the order information sent by the customer-client 10 and notifies the control part 32 of the above information.

The order information providing part 35 receives an order from the customer and then provides the information related to the order to the retailer.

The lead-time calculating part 36 refers to a lead-time information file 392 (see in FIG. 2) and a product location information file 393 and then calculates a lead-time within a corporation. In addition, the lead-time calculating part 36 calculates a total shipping time required for all corporations that are associated with a manufacture or a procurement of a product to a shipping of the product.

The fee calculating part 37 refers to a product information file 396 and the like, and then calculates a charge for the product. The product price and freight may be separately calculated. Alternatively, the product price and the freight may be totaled.

Also, the transaction server 30 adds a maintenance fee of the transaction server 30 (for example, the calculated price× %) to the calculated price. In addition, a part of the maintenance fee of the transaction server 30 can be charged periodically to each corporation based on a sales achievement, a transaction number, a processed data number.

Figure 2:
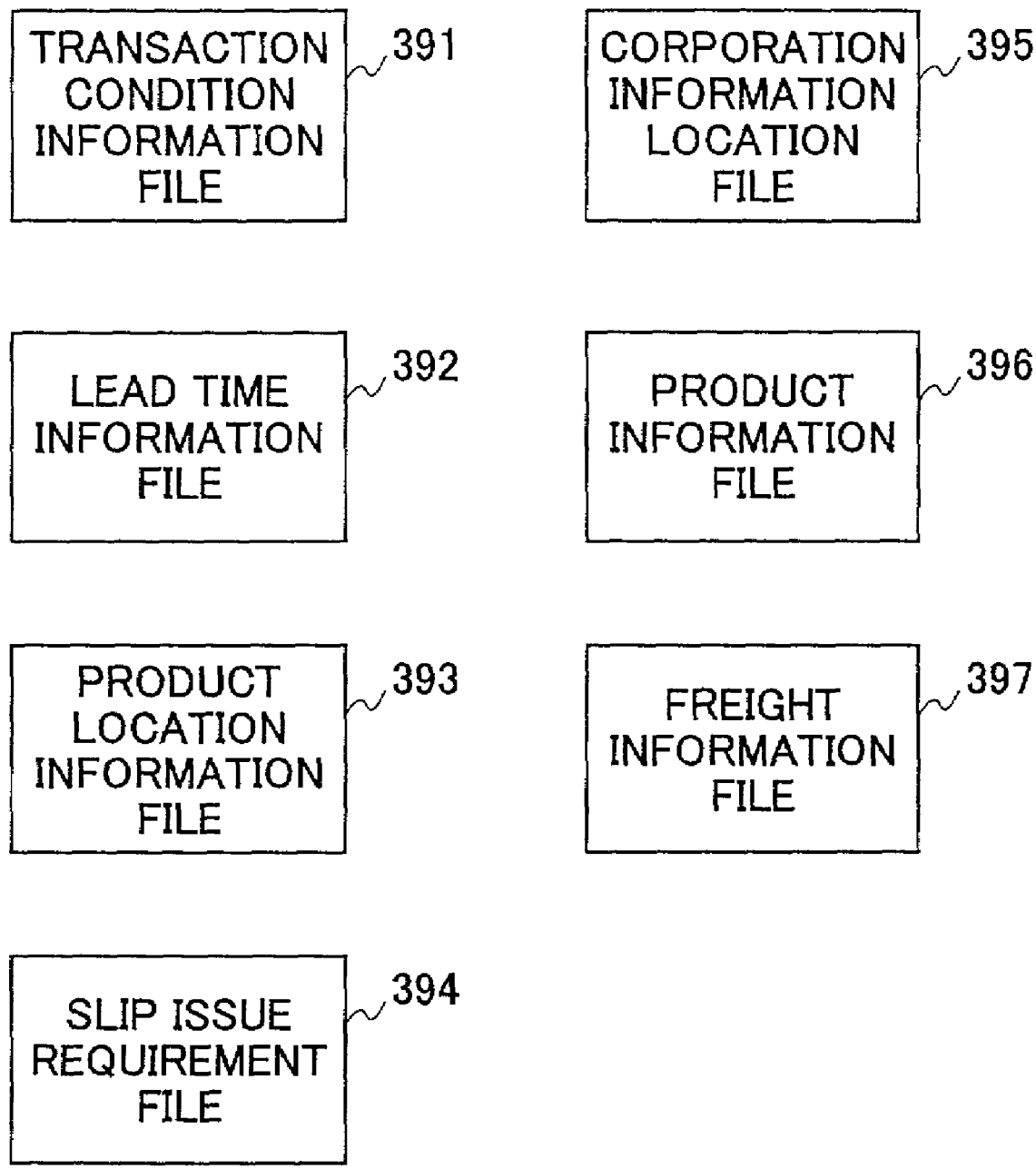
FIG. 2 is a diagram showing an example of the corporation information file.

The searching part 38 searches for the product information master 40, a corporation information location file 395 (in FIG. 2), a transaction condition information file 391 (in FIG. 2).

The product information master 40 stores a product name, the product information related to a product, corporation information related to a corporation handling the product, a payment method, a shipping method, and the like.

Based on the information stored in the above files, information for the information inquiry is provided to the customer. Also, as described later, the above-described files are used to search for a corporation related to a product which the customer selected to purchase.

The corporation information file 39 stores information of each corporation.

The corporation information file 39 is provided for each corporation participant. Each corporation participant has a responsibility for managing its corporation information file 39.

For example, if the corporation participant is a retailer, the corporation participant updates the transaction condition information file 391, the lead-time information file 392 and the product information file 396.

FIG. 2 is a diagram showing an example of the corporation information file 39.

In FIG. 2, the corporation information file 39 includes the transaction condition information file 391, the lead-time information file 392, the product location information file 393, a slip issue requirement file 394, a corporation information location file 395, a product information file 396 and a freight information file 397.

The transaction condition information file 391 is provided for each corporation and is referred in the transaction condition process to the retailer or the distributor.

The transaction condition information file 391 includes a corporation code, a product code, a handling flag, a stock flag, a client code, a delivery service code and the like.

The lead-time information file 392 stores a shipping lead-time, a production lead-time and the like, and is used to determine a requirement time for delivery and a delivery date. For example, the lead-time information file 392 for the retailer and the distributor includes a shipping-out location and a shipping lead-time.

The product location information file 393 is used to calculate a transportation lead-time and includes the product code and shipping-out location.

The slip issue requirement file 394 stores information necessary for issuing a slip to the retailer, the distributor or the delivery service.

The corporation information location file 395 stores storage location information in which location the transaction condition information of the corporation attendant is stored.

The storage location is specified by a network address and a file name.

The transaction server 30 handles the corporation information location file 395 the same as a DNS (Domain Name System) of the Internet. That is, when a corporation, which is searched for, is not stored yet in the corporation information location file 395 of the transaction server 30 itself, the transaction server 30 inquires the corporation information location file 395 of another transaction server 30.

Alternatively, for a smooth inquiry, all the corporation information location files 395 can be hierarchically structured. In this case, also, the transaction servers 30 may be hierarchically structured so that eventually all the corporation information location files 395 can be hierarchically structured. Then, an inquiry is conducted to the corporation information location file 395 positioned in the highest layer.

The product information file 396 is used to calculate the total product price and includes the product code, a product attribute and the product price.

A freight information file 397 is used to calculate freight, a shipping-out location, a receiving location and a product attribute.

A process flow will now be described with reference to FIG. 3. It is assumed that the customer-client 10, the retailer-client 61, the distributor-client 62 and delivery service-client 63 are connected to the transaction server 30 through the Internet.

In step S100, the transaction server 30 provides the information related to the product to the customer-client 10.

For example, when the customer using the customer-client 10 accesses the transaction server 30 and conducts a predetermined window operation, the information related to the product is provided to the customer-client 10.

The information related to the product is transmitted to the customer-client 10 as an information inquiry window (not shown) provided by the product and delivery information providing part 33 of the transaction server 30.

In the customer-client 10, product information, purchase condition information, corporation information and the like are displayed on the information inquiry window.

The product information includes a product name, a product image, a price and the like. The purchase condition information includes a shipping method, a payment method and the like. The corporation information includes a retailer name, a maker name and the like.

For example, the above information is grouped by the retailer, the maker and the product name and displayed.

In step S101, the customer-client 10 refers to the information related to the product provided by the transaction server 30 so that the customer selects a desired product (a product to purchase).

In a situation in which the customer selects a product, the customer selects a desired product or a product which a specific retailer handles.

When a product handled by the specific retailer is selected by the customer, as selection information, information including a retailer code, a product code, a shipping method, a shipping destination address code and the like is transmitted to the transaction server 30. In this case, only the specific retailer handles the product, or a plurality of retailers handle the same one but the customer wants to purchase from a specific retailer.

On the other hand, when a product is selected, as the selection information, information including the product code, the shipping method, the shipping destination address code and the like is transmitted to the transaction server 30.

In step S102, the transaction server 30 receives the selection information. The transaction server 30 generates a delivery schedule with respect to the selection information and then provides the delivery schedule to the customer-client 10.

When the customer selects the product handled by the specific retailer, the transaction server 30 generates the delivery schedule showing the indicated retailer name, the product name, the price, the delivery date and the like, and then provides the delivery schedule to the customer-client 10.

When the customer simply selects the product, the delivery schedule showing the product name, the price, the delivery date and the like is generated for each retailer handling the product (generally, there are many retailers handling the same product). Then, the delivery schedule is provided to the customer-client 10.

In step S103, the customer-client 10 refers to the delivery schedule and then makes an order on a window.

When the customer selects the product because of the specific retailer, the customer can refers to the delivery schedule showing the delivery date and the like of the retailer and then makes an order if the customer wants.

When the customer simply selects the product, the customer selects the most preferable retailer based on the delivery schedule showing the price, the delivery date and the like for each retailer, and then makes an order.

Order information includes purchaser information, shipping destination information, the product code, the retailer code, an amount of payment, the payment method, the shipping method and the like.

In step S104, the transaction server 30 receives the order information. Then, the transaction server 30 generates slip information necessary to generate a slip for the retailer, the distributor and the delivery service and provides the slip information to the retailer, the distributor and the delivery service.

Figure 4:
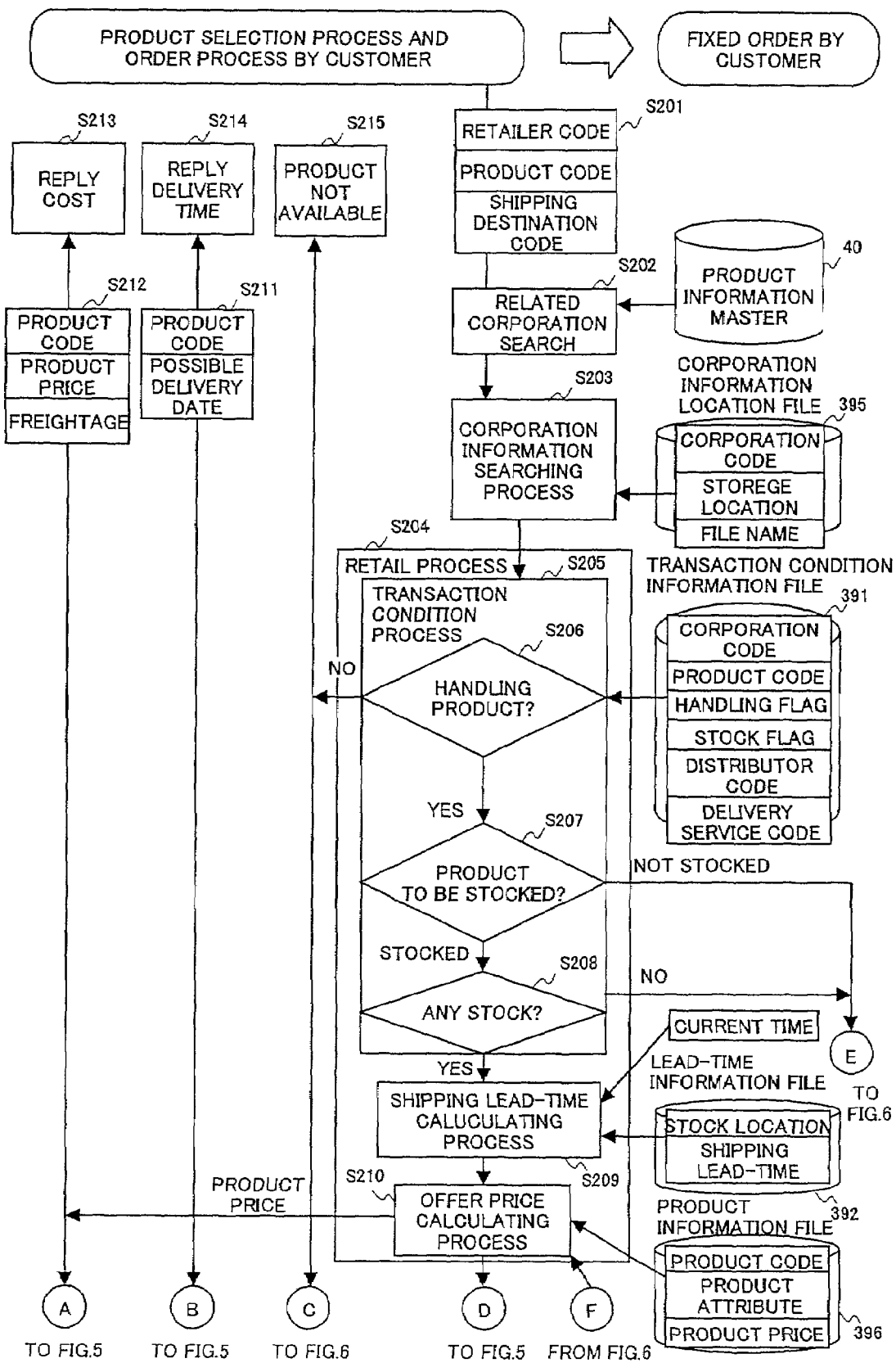
FIG. 4 is a flowchart for explaining processes conducted in the transaction server.
Figure 5:
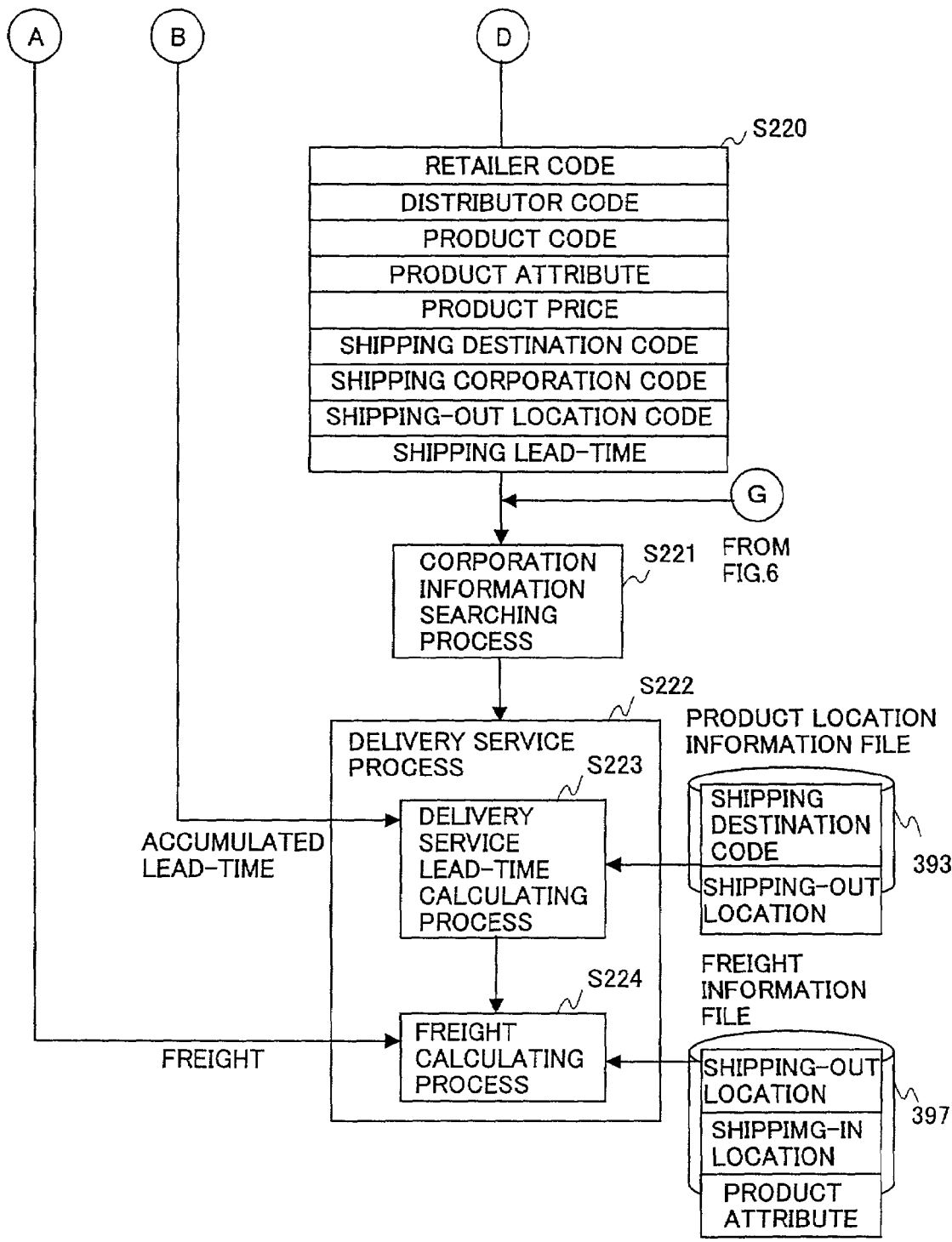
FIG. 5 is a flowchart for explaining processes conducted in the transaction server.
Figure 6:
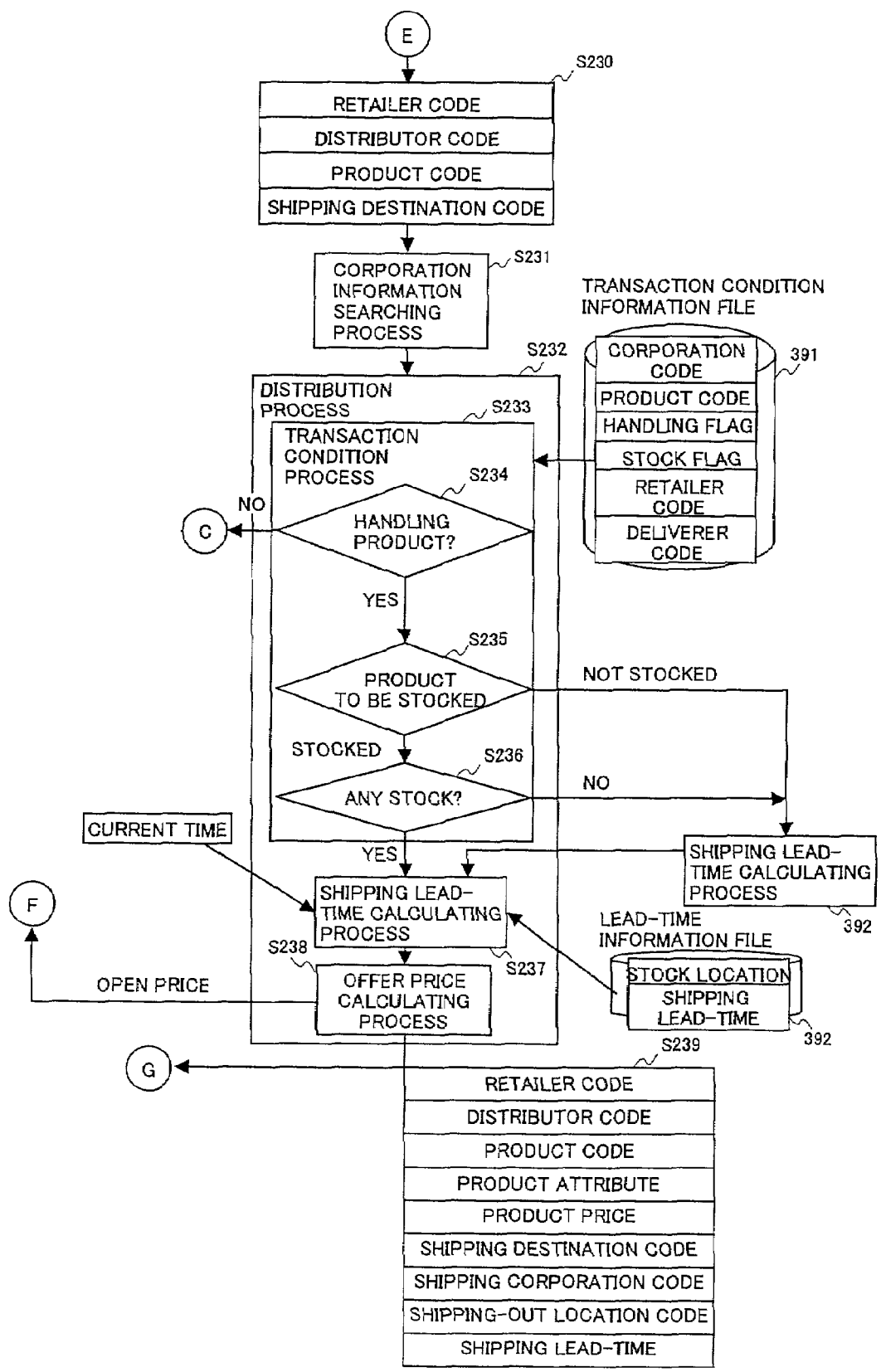
FIG. 6 is a flowchart for explaining processes conducted in the transaction server.

A process of the transaction server 30 in the step S102 will now be described with reference to FIGS. 4, 5 and 6. It should be noted that the process shown in FIGS. 4, 5 and 6 is a main function of the transaction server 30 and automatically switches a received order as described later.

The transaction server 30 receives the selection information including the retailer code, the product code, the shipping destination code (step S201). Then, the transaction server 30 generates the delivery schedule showing the indicated retailer name, the product name, the price, the delivery date and replies to the customer-client 10 with the delivery schedule. When the product is not available, the transaction server 30 replies to the customer that the product is not available (step S215).

When the transaction server 30 receives the selection information, the transaction server 30 refers to the product information master 40 and then searches for a retailer handling the product selected by the customer (step S202). When the customer selects the product because of the specific retailer, the step S202 can be omitted.

A corporation information searching process is conducted (step S203).

In the corporation information searching process, the corporation information location file 395 is referred to and the corporation information location for the retailer of the product selected by the customer is searched for.

When the corporation information location file 395 of the retailer handling the product selected by the customer is found, the transaction server 30 accesses to the corporation information location file 395. The transaction server 30 refers to the transaction condition information file 391 and conducts a retail process in step S204.

In the step S203, when the retailer related to the product selected by the customer is not registered in corporation information location file 395, the transaction server 30 makes an inquiry of another transaction server 30 to search for a storage location storing the transaction condition information file 391 for the retailer.

In a case in which the transaction server 30 makes an inquiry of another transaction server 30, when the storage location storing the transaction condition information file 391 for the retailer is found in another transaction server 30, the transaction server 30 that made the inquiry accesses the storage location. Then the transaction server 30 can refer to the transaction condition information file 391 for the retailer and conduct a retail process in step S205.

In the above case in which the transaction server 30 makes an inquiry of another transaction server 30, the retail process in the step S204 may be conducted by another transaction server 30. The transaction server 30 that made the inquiry may receive a result from another transaction server 30 and then may reply to the customer based on the result.

In the retail process in the step S204, first, a transaction condition process is conducted (step S206). In the transaction condition process, the transaction condition information file 391 is referred to and then it is determined whether or not the retailer handles the product.

When it is determined that the retailer handles the product (Yes in the step S206), the transaction condition process goes to step S207. On the other hand, when it is determined that the retailer does not handle the product (No in the step S206), it is replied to the customer that the product is not available.

Subsequently, it is determined whether or not the product is in stock (step S207). When it is determined that the product is in stock (in stock in step S207), the transaction condition process goes to step S208.

On the other hand, when it is determined that the product is not in stock (not in stock in step S207), a distribute process shown in FIG. 6 is conducted.

In step S208, it is checked whether or not there is any stock of the product.

When the product is available (Yes in step S208), the transaction condition process goes to step S209. On the other hand, when the product is not available (No in step S208), the transaction condition process goes to the distribution process shown in FIG. 6.

In the step S209, the lead-time calculating part 36 refers to a current time and the lead-time information file 392 and then calculates a shipping lead-time.

In step S210, the fee calculating part 37 refers to the product information file 396 and then conducts an offer price calculating process. As a result, a charge (a price) to the retailer is calculated.

Subsequently, data, which includes a retailer code, a distributor code, a product code, a product attribute, a product price, a shipping destination code, a shipping corporation code, a shipping-out location code, a shipping lead-time (calculated in the step S209) and the like, is notified of a delivery service process (step S220).

The product attribute is information to determine the shipping method. For example, the shipping method is determined based on whether the product is fragile, whether the product is refrigerated, a weight, a volume or the like.

In step S221, a corporation information searching process is conducted similarly to the process in the step S203 in FIG. 4. In the corporation information searching process, the corporation information location file 395 is referred to and then the corporation information location for the retailer handling the product selected by the customer is searched for.

Thereafter, the delivery service process is conducted (step S222).

In step S223 of the delivery service process, the lead-time calculating part 36 refers to the product location information file 393 storing a product location and then calculates the shipping lead-time.

In step S224, the fee calculating part 37 refers to the freight information file 397 and then calculates the freight. As a result, the freight to the delivery service is calculated.

The transaction server 30 may separately reply the product price obtained in the retail process in the step S204 and the freight obtained in the delivery service process in the step S222 (steps S212 and S213). Then, the fee calculating part 37 may calculate a total expense of the product price calculated in the step S210 and the freight calculated in the step S224. In addition, the transaction server 30 may provide the total expense additionally with the product code and reply the total expense to the customer.

Also, the transaction server 30 replies the delivery time to the customer based on a total time of the shipping lead-time calculated in the step S209 and the delivery service lead-time calculated in step S223 by the lead-time calculating part 36 (step S214).

The transaction server 30 generates the delivery schedule including the retailer code, the product name, the price, the freight, available delivery date and the like and then replies to the customer.

The example of the case in which there are some products in stock at the retailer is explained above. However, when it is determined in the step S207 in FIG. 4 that the product is not in stock (Not in stock in the step S207) or when it is determined in the step S208 in FIG. 4 that there is no stock of the product (No in the step S208), the distribution process is conducted (E in FIG. 6).

In step S230, information including the retailer code, the distributor code, the product code, the shipping destination code and the like is provided from the retail process.

In step S231, the corporation information searching process is conducted the same as the process in the step S203 in FIG. 4. In the corporation information searching process, the corporation information location file 395 is referred to and then the corporation information location for the distributor handling the product selected by the customer is searched for.

The distribution process is conducted (step S232).

The transaction condition information file 391 of the retailer handling the product selected by the customer is referred to and then the distribution process is conducted in step S232.

In the distribution process in the step S232, first, the transaction condition process (step S233) is conducted. In the transaction condition process, the transaction condition information file 391 is referred to and then it is determined in step S234 whether or not the product is handled.

When it is determined that the product is handled (Yes in the step S234), the transaction condition process goes to step S235. On the other hand, when it is determined that the product is not handled (No in the step S234), the transaction condition process goes to C in FIG. 4 and then replies to the customer that the product is not available.

In step S235, it is determined whether or not the product is in stock. When it is determined that the product is in stock (in stock in step S235), the transaction condition process goes to step S236.

On the other hand, when it is determined that the product is not in stock (no stock in step S235), another distribution process for another distributor (not shown) is conducted. In another distribution process for another distributor, when the product is not in stock, a manufacture process for a manufacturer of the product selected by the customer is conducted. In FIG. 6, a result of a production lead-time calculating process in the manufacture process is used.

In step S236, it is checked whether or not there is any stock of the product.

When the product is available (Yes in step S236), the transaction condition process goes to step S237. On the other hand, when the product is not available (No in step S236), the transaction condition process goes to another distribution process for another distributor or the manufacture process for the manufacturer of the product selected by the customer.

In the step S237, the lead-time calculating part 36 refers to the current time and the lead-time information file 392 and then calculates the shipping lead-time.

In step S238, the fee calculating part 37 conducts the offer price calculating process when the price is an open price. When the price is not an open price, similarly to the step S210 in FIG. 4, the fee calculating part 37 refers to the product information file 396 and then calculates the price.

When the step S238 is completed, the delivery service process (G in FIG. 5) is conducted. The distribution process notifies information, which includes the retailer code, the distributor code, the product code, the product attribute, the product price, the shipping destination code, the shipping corporation code, the shipping-off location code, the shipping lead-time and the like, of the delivery service process (step S239).

Figure 7:
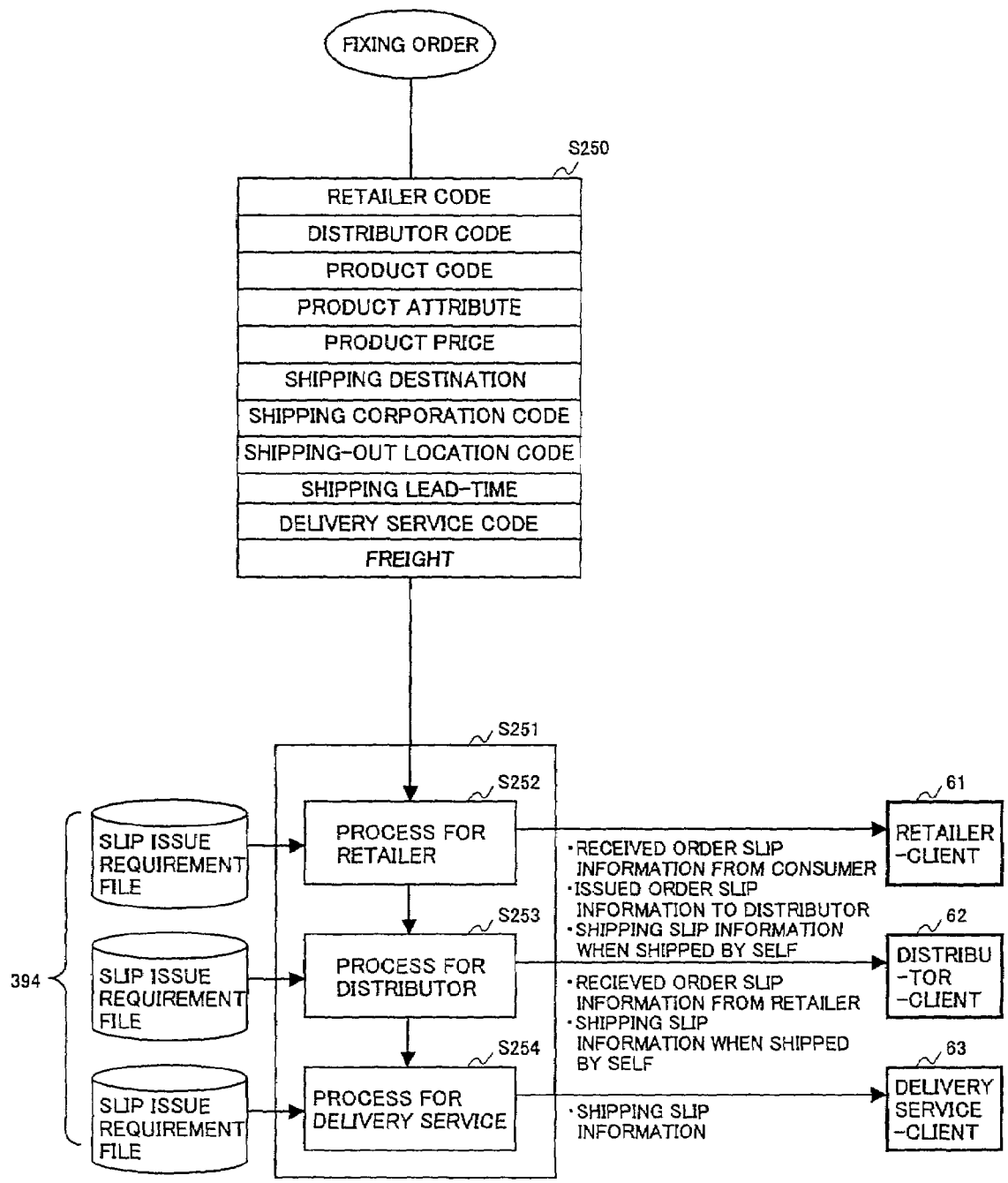
FIG. 7 is a diagram for explaining a process of the transaction server when the customer fixes the order.

FIG. 7 is a diagram for explaining a process of the transaction server when the customer fixes the order.

When the customer fixes the order, the customer-client 10 notifies information, which includes the retailer code, the distributor code, the product code, the product attribute, the product price, the shipping destination code, the shipping corporation code, the shipping-out location code, the shipping lead-time, the delivery service code and the freight, of the transaction server 30 (step S250).

When the transaction server 30 receives the information, the transaction server 30 refers to the slip issue requirement file 394 (step S251) and then conducts a process for the retailer-client 61 (step S252). Then, the process for the retailer-client 61 notifies received order slip information from a consumer as a customer, issued order slip information to the distributor-client 62 and shipping slip information when shipped by retailer's self, of the retailer-client 61.

Similarly, a process for a distributor-client 62 is conducted (step S253). The process for the distributor-client 62 notifies received order slip information from the retailer-client 61 and shipping slip information when shipped by distributor's self, of the distributor-client 62.

Similarly, a process for a delivery service 63 is conducted so as to send shipping slip information to the delivery service 63 (step S254).

At the same time when the transaction server 30 accepts the order from the customer, transactions between corporations related to the product which the customer purchases are completed. Accordingly, at a time when the delivery schedule is provided to the customer, corporations related to the product ordered by the customer set up temporarily reserves for the product. The transaction server 30 as a transaction center maintains trace information showing every conducted transaction in a time sequence. After the order is completed, the transaction server 30 issues an order needed to each corporation based on the trace information.

In the process in the step S102 of the transaction server 30 as described with reference to FIGS. 4, 5 and 6, may be utilized in a case in which the customer refers to a part of or the entire information including the retailer code, the product code, the shipping destination code and then inquires the delivery schedule.

In this case, the transaction server 30 refers to the corporation information file 39 and the product information master 40 and replies to the customer-client 10 based on the lead-time calculating part 36 and the fee calculating part 37.

Therefore, the processes described in FIGS. 4, 5 and 6 can be suitably conducted before or after the order is issued.

Also, the inquiry of the delivery schedule from the customer-client 10 may not be conducted at once but phased inquires may be conducted. At a final phase, the delivery schedule including the shipping method and the shipping destination information may be inquired.

In general, when the product is shipped from the retailer, a delivery service being in accordance with the transaction condition of the retailer delivers the product to a consumer. Also, when the product is shipped from the distributor, another delivery service chosen by the distributor delivers the product to the consumer.

According to the prevent invention, even if when the product is shipped by the distributor, the retailer can choose the distributor.

In addition, the transaction server 30 may check whether or not the product is delivered in accordance with the order or whether or not the consumer pays for the product.

Figure 8:
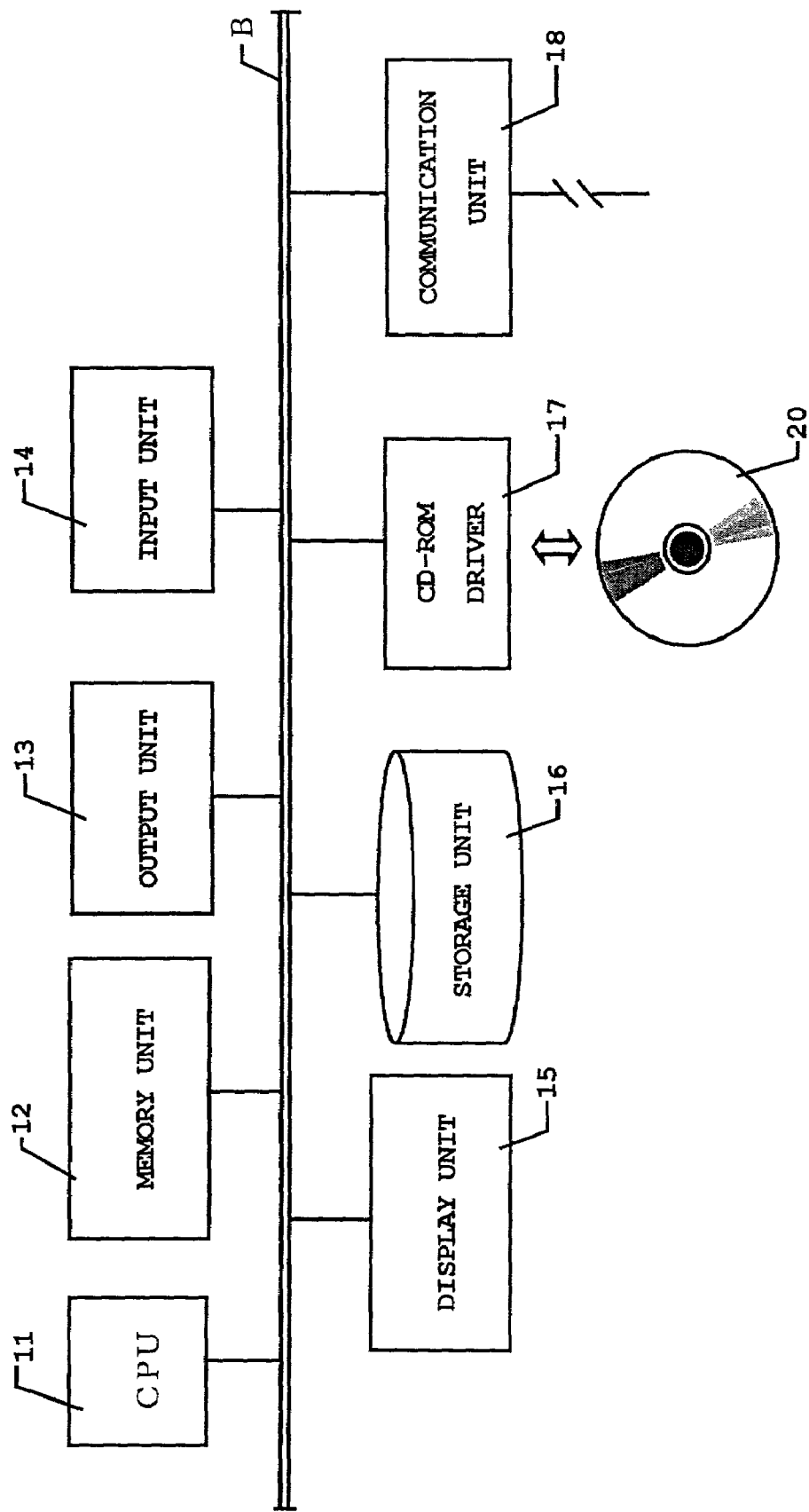
FIG. 8 is a block diagram of a hardware configuration of the transaction server according to the present invention.

FIG. 8 is a block diagram of a hardware configuration of the transaction server according to the present invention.

In FIG. 8, the transaction server 30 includes a CPU (Central Processing Unit) 11, a memory unit 12, an output unit 13, an input unit 14, a display unit 15, a storage unit 16, a CD-ROM driver 17 and a communication unit 18, all of which are connected together through a bus B.

The CPU 11 controls the transaction server in accordance with programs stored in the memory unit 12 and also executes processes (described above) in the transaction server 30. The memory unit 12 includes a RAM and a ROM and stores the programs executed by the CPU 11, data necessary for processes and data obtained by the processes. Also, a part of an area of the memory unit 12 is used as a working area for the processes executed by the CPU 11.

The communication unit 18 controls data transmissions for sending or receiving information between the transaction server 30 and the customer-client 10, the retailer-client 61, the distributor-client 62 or the delivery service-client 63.

The input unit 14 includes a mouse, a keyboard or the like and is used to input information. The display unit 15 displays information for a manager of the transaction server 30.

The storage unit 16 includes a hard disk and stores the corporation information file 39 and programs.

For example, programs of the processes are installed into the transaction server 30 by loading a CD-ROM 20 into the CD-ROM driver 17. That is, when the CD-ROM 20 storing the program for regenerating a trading board is inserted in the CD-ROM driver 17, the CD-ROM driver 17 reads the program from the CD-ROM 20 and the program read from the CD-ROM 20 is installed into the storage unit 16 via the bus B. When the processes are executed, the CPU 11 executes the process in accordance with the program installed into the storage unit 16. It should be noted that a recording medium is not limited to the CD-ROM 20, but another computer-readable recording medium such as a magnetic disk, a magnetic tape, an optical disk, a magneto-optical disk, a semiconductor memory or the like may be used.

As described above, when the consumer purchases the product through the Internet, the purchase condition for each retailer is provided to the consumer. Therefore, it is possible for the consumer to purchase the product from the most suitable retailer.

In addition, the delivery schedule, which is provided to the consumer, is a practical schedule. Therefore, it is possible to certainly deliver the product to the consumer on the delivery schedule.

Moreover, the transaction conditions among corporations are determined based on the order received from the consumer. Therefore, it is not required to conduct any new transaction among the corporations and then the entire process for the corporation can be quickly completed. That is, the received order is not forwarded from the retailer to the distributor such as the conventional method. At a time when the order is received form the consumer, the received order slip information for the retailer is provided and simultaneously, the issued order slip information and the shipping slip information from the retailer to the distributor are provided. Therefore, it is possible to complete all the processes for the corporations related to the product selected by the consumer at once.

Furthermore, it is possible for the consumer to consider the price, the delivery date and the like and then to make an order. That is, based on the price for each retailer, the delivery date and the like, the consumer may issue an order of the product to the retailer offering a lower price when the delivery date is allowed to be late. On the other hand, the consumer may issue an order of the product to the retailer even if the retailer offers a higher price when the delivery date is critical for the consumer and the retailer delivers the product in the shortest time.

In addition, according to the present invention, it is possible for the consumer to know a current practical delivery time, instead of a predetermined delivery time, and then to purchase the product. In particular, when the retailer does not have enough stock of the product selected by the consumer, the delivery schedule showing that the product is not available can be provided to the consumer. Also, in the transaction system according to the present invention, the delivery schedule of the product, which is not yet in market but is in market soon, can be provided so that the consumer can know the delivery date of the product through the Internet.

Moreover, even if the retailer does not have any product in stock, it is possible for the retailer to reply the delivery time to the consumer based on the transaction condition of the distributor. Therefore, the retailer can eliminate a risk of holding the product in stock by itself.

Furthermore, in the transaction system according to the present invention, all transactions among corporations are automated. Therefore, it is possible for the corporations in the transaction system to make a quick decision and then to reduce a transaction time among the corporations.

In the embodiment, the process between the customer and the retailer in which the customer is a consumer is mainly explained. But the present invention is not limited to a case only in which the customer is a consumer. That is, the present invention can be applied to any transaction between corporations.

Also, the corporation information location file 395 can be utilized the same as the DNS on the Internet.

In addition, since it is possible to use the transaction condition information file 391 for each corporation the same method as such a file on the Internet, the transaction system according to the present invention has a affinity to the Internet. Therefore, in a case in which the transaction system is structured using the Internet, it is possible to access and also to search for the transaction condition information file 391 at highest speed.

Moreover, according to the present invention, when there is no information of a corporation related to the product in the corporation information location file 395 and/or transaction condition information file 391 in which product the customer wants to buy, or there is no transaction condition information file 391 for the corporation related to the product, the transaction server 30 can inquire of another transaction server 30 that maintains the corporation information location file 395 storing the corporation and/or the transaction condition information file 391 of the corporation. Therefore, the transaction can be processed by a plurality of the transaction servers 30.

Furthermore, when the transaction server 30 receives the inquiry of the corporation information location file 395 storing the corporation information or/and the transaction condition of the corporation, and/or the transaction condition information file 391, the transaction server 30 can directly provide a result of the inquiry. Therefore, if the transaction server 30 is provided for each business type, it is possible to conduct the above processes in accordance with process logic corresponding to the business type.

According to the present invention, a delivery data is determined based on a current total delivery time required delivering the product through all the corporations associated with a manufacture or a procurement of the product to a shipping of the product. Therefore, the transaction server 30 can automatically provide the delivery date to the customer.

Figure 3:
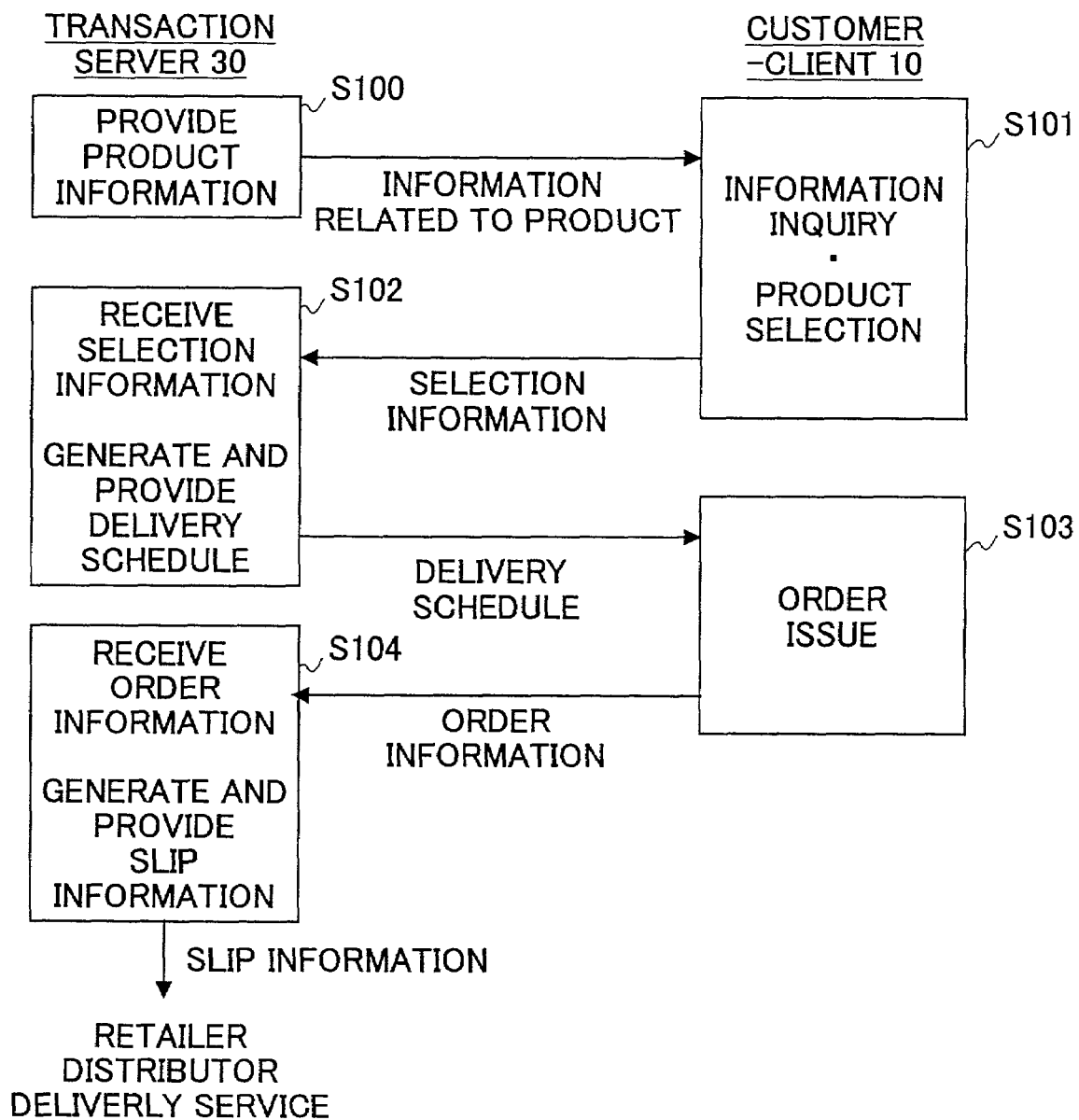
FIG. 3 is a diagram for explaining a network transaction.

In the embodiment, the step S100, the step S102 and the step S104 in FIG. 3 correspond to the step (a), the step (b) and the step (c) in claim 1, respectively.

Also, the step S202 in FIG. 4, the transaction information file 391 in FIG. 2 or FIG. 4, the corporation information location file 395 in FIG. 2 or FIG. 4, the step S203 in FIG. 4 correspond to the step (d), the transaction condition information file, the corporation information location file and the step (e) in claim 2, respectively.

The present invention is not limited to the specifically disclosed embodiments, variations and modifications, and other variations and modifications may be made without departing from the scope of the present invention.

The present application is based on Japanese Priority Application No. 2000-253054 filed on Aug. 23, 2000, the entire contents of which are hereby incorporated by reference.

What is claimed is:

1. A method of determining in a transaction center a product delivery date and to facilitate a transaction between a customer buying a product and a retailer selling the product through a network, said method comprising:

connecting the transaction center with a customer terminal of the customer, a retailer terminal for each of a plurality of retailers as one kind of corporation, at least one distributor-client of a distributor as another kind of corporation and at least one delivery service terminal through the network, and each having a corporation information file;

providing information concerning the product to said customer, the information being stored in a product information master and comprising a product name, a product image, a product price, a shipping method and a payment method grouped together for each of a plurality of retailers, simultaneously;

receiving information showing the product selected by the customer to buy and searching for related corporations, which handle the product to buy, from the product information master;

searching for a location of a transaction condition information file of the each of the searched related corporations by referring to a corporation information location file storing information of the location of the transaction condition file which stores a transaction condition including information indicating a stock state and information concerning a retailer and a distributor of each of the related corporations;

determining whether the stock state indicates that the product to buy is stocked by referring to the transaction condition information, which exists at the searched location, of each of the related corporations;

calculating a shipping lead-time based on a current time and shipping lead-time information obtained from a lead-time information file being maintained in the corporation information file, if the product to buy is stocked;

calculating a delivery service lead-time based on a delivery service lead-time information obtained based on a combination of a shipping destination and a shipping-out location from a product location information file being maintained in the corporation information file, if the product to buy is stocked;

obtaining the delivery date corresponding to a total sum of the shipping lead-time and the delivery service lead-time, if the product to buy is stocked;

conducting the calculating a shipping lead-time, the calculating a delivery service lead-time, and the obtaining the delivery date for each of the retailer and the distributor as the related corporations if the product to buy is not stocked;

providing to the customer a delivery schedule including the delivery date of the product;

receiving an order from the customer, the order including a retailer code, a distributor code, a product code, a product attribute, a product price, a shipping destination code, a shipping corporation code, a shipping-out location code, a shipping lead-time, a delivery service code and a freight from the customer terminal;

referring to a slip issue requirement file storing information for issuing a slip to the retailer, the distributor and the delivery service, independently; and conducting relative processes for the retailer, the distributor, and the delivery service, whereby all processes for the corporations related to the product are completed simultaneously, and no further transaction has to be conducted among the corporations.

2. The method as claimed in claim 1, wherein the receiving information showing the product selected by the customer comprises:

searching for a related corporation related to the product selected by the customer;

searching for storage location information corresponding to a location of a transaction condition information file of a corporation by using a corporation information location file of the related corporation; and generating the delivery schedule with reference to the transaction condition information of the related corporation.

3. The method as claimed in claim 2, wherein the searching for the storage location information comprises inquiring the location of the transaction condition information file of the related corporation, of another transaction center when the related corporation related to the product selected by the customer to buy is not registered to said corporation information location file.

4. A network system for determining a product delivery date comprising a customer-client used by a customer conducting a transaction and connected to a network, and at least one transaction center connected to said network to facilitate the transaction between the customer and a retailer, said transaction center comprising:

a product information providing part providing information concerning the product to said customer, the information comprising a product name, a product image, a product price, a shipping method and a payment method grouped together for each of a plurality of retailers, simultaneously;

a delivery schedule information providing part receiving information showing the product selected by the customer to buy which corresponds to one of the retailers, and providing a delivery schedule including a delivery date of the product, and said customer-client comprising:

a product selecting part receiving the information concerning the product from said transaction center and selecting the product to buy; and an order issuing part receiving the delivery schedule information from said transaction center and issuing an order of the product selected by said product selecting part, wherein the transaction center further comprises:

a lead-time calculating part calculating a shipping lead-time based on a current time and shipping lead-time information obtained from a lead-time information file if the product is in stock by searching for corporations, which handle the product, in a product information master, searching for a location of a transaction condition information file of the each of the searched corporations by referring to a corporation information location file which stores a transaction condition including information indicating a stock state, determining whether the stock state indicates that the product is stocked by referring to the transaction condition information, and calculating a delivery service lead-time based on delivery service lead-time information obtained based on a combination of a shipping destination and a shipping-out location from a product location information file; and for obtaining the delivery date corresponding to a total sum of the shipping lead-time and the delivery service lead-time.

5. The network system as claimed in claim 4, wherein said at least one transaction center is provided for each region, each business type and each product type.

6. A transaction center for determining a product delivery date and to facilitate a transaction between a customer buying a product and a retailer selling the product through a network, said transaction center being connectable with a customer terminal of the customer, a retailer terminal of the retailer, at least one-distributor-client of a distributor, each retailer and distributor being a corporation, and at least one delivery service terminal through the network and having a corporation information file, said transaction center comprising:

a product information providing part providing information concerning the product to said customer, the information comprising a product name, a product image, a product price, a shipping method and a payment method grouped together for each of a plurality of retailers, simultaneously;

a delivery schedule information providing part receiving information showing the product selected by the customer to buy which corresponds to one of the retailers, and providing a delivery schedule including a delivery date of the product;

an order information providing part receiving an order from the customer and providing information concerning the order to the retailer; and a lead-time calculating part calculating a shipping lead-time based on a current time and shipping lead-time information obtained from a lead-time information file if the product is in stock by searching for corporations, which handle the product, in a product information master, searching for a location of a transaction condition information file of the each of the searched corporations by referring to a corporation information location file which stores a transaction condition including information indicating a stock state, determining whether the stock state indicates that the product is stocked by referring to the transaction condition information, and calculating a delivery service lead-time obtained based on delivery service lead-time information obtained based on a combination of a shipping destination and a shipping-out location from a product location information file and obtaining the delivery date corresponding to a total sum of the shipping lead-time and the delivery service lead-time.

7. The transaction center as claimed in claim 6, further comprising:

a product information master storing information concerning the product;

a corporation information location file storing a storage location of transaction condition information of a corporation; and a transaction condition information file storing a transaction condition of the corporation, wherein said delivery schedule information providing part comprises:
- a related corporation searching part searching for a related corporation related to the product selected by the customer by using the product information master;
- a corporation information location searching part searching for said storage location of the transaction condition information file of a corporation by using said corporation information location file of the related corporation; and
- a delivery schedule information generating part generating the delivery schedule with reference to the transaction condition information file of the related corporation.

8. The transaction center as claimed in claim 6, wherein said corporation information location searching part comprises a inquiring part inquiring the storage location of the transaction condition information file of the related corporation, of another transaction center when the related corporation related to the product selected by the customer to buy is not registered to said corporation information location file.

9. The transaction center as claimed in claim 6, further comprising the lead-time calculating part calculating a current total delivery time required delivering the product through all the corporations associated with a manufacture or a procurement of the product to a shipping of the product,
wherein said delivery schedule information providing part provides the delivery schedule including said delivery date based on the current total delivery time calculated by the lead-time calculating part.

* * * * *